United States Patent
Yee

(10) Patent No.: US 8,899,810 B2
(45) Date of Patent: *Dec. 2, 2014

(54) LIQUID MICRO-SHUTTER DISPLAY DEVICE

(75) Inventor: Youngjoo Yee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 214 days.

This patent is subject to a terminal disclaimer.

(21) Appl. No.: 13/521,190

(22) PCT Filed: Oct. 12, 2011

(86) PCT No.: PCT/KR2011/007565
§ 371 (c)(1),
(2), (4) Date: Jul. 9, 2012

(87) PCT Pub. No.: WO2012/173308
PCT Pub. Date: Dec. 20, 2012

(65) Prior Publication Data
US 2012/0327683 A1    Dec. 27, 2012

(30) Foreign Application Priority Data
Jun. 16, 2011    (KR) .................... 10-2011-0058720

(51) Int. Cl.
G02B 26/00    (2006.01)
F21V 8/00    (2006.01)
G09F 13/04    (2006.01)

(52) U.S. Cl.
CPC .................... *G02B 26/004* (2013.01)
USPC ........................................ 362/602; 362/97.1

(58) Field of Classification Search
CPC ........................................ G02B 26/00
USPC ........................................ 362/602, 97.1
See application file for complete search history.

(56) References Cited

U.S. PATENT DOCUMENTS

2006/0285067 A1    12/2006  Kim
2009/0103159 A1    4/2009   Cheng et al.

FOREIGN PATENT DOCUMENTS

KR    10-2006-013124 A    12/2006
KR    10-2008-0060104 A    7/2008
KR    10-2008-0071254 A    8/2008

*Primary Examiner* — Anh Mai
*Assistant Examiner* — Elmito Breval
(74) *Attorney, Agent, or Firm* — Birch, Stewart, Kolasch & Birch, LLP

(57) ABSTRACT

Disclosed is a display device. In detail, a liquid micro-shutter display device includes a light source emitting light, a transparent lower substrate positioned in an light path of the light source, an optical conversion unit performing at least one of a function of converting light from the light source into light having a different wavelength band corresponding to a sub-pixel and a function of reflecting ambient light corresponding to a sub-pixel, a transparent upper substrate positioned in an light path of light output from the optical conversion unit, and a liquid micro-shutter positioned between the transparent lower substrate and the transparent upper substrate and opening and closing the path of light or adjusting an open area.

21 Claims, 15 Drawing Sheets

Maximum brightness: $T_{open} = T_f - T_{reset} = (2^N - 1) \times t_0$

Arbitrary Grey Scale: $T_{open} = n \times t_0, \ 0 \leq n \leq (2^N-1)$

LIQUID MICRO-SHUTTER DISPLAY DEVICE

TECHNICAL FIELD

The present invention relates to a liquid micro-shutter display device, and particularly, to a micro-shutter display device capable of improving light usage efficiency, reducing power consumption, and providing sharp picture quality.

BACKGROUND ART

A liquid crystal display (LCD) device, a representative example of a display device, is used as a display device of almost every electronic device such as a display of a television, a monitor, or the like, a portable device such as a mobile phone, a portable multimedia player (PMP), an MP3 player, a digital camera, or the like, a public information display (PID) for displaying information in a public area, an indoor/outdoor advertisement display, or the like.

A general LCD device according to a conventional technique includes a plurality of pixels arranged in a two-dimensional (2D) matrix form. Here, each pixel includes transparent substrates facing each other, transparent electrodes formed on the substrates, and a liquid crystal encapsulated between the transparent electrodes. In case of a color display, color filters constituting sub-pixels are formed on the surfaces of the transparent substrates in order to express colors such as red, green, blue, and the like. Polarizer plates (or polarizer layers) which are perpendicular to each other and have polarization characteristics are disposed on both sides of the transparent substrates. At usual times, the polarizer plates block light irradiated from a backlight unit. However, when a voltage is applied to the liquid crystal, an alignment of the liquid crystal is rotated to change a phase of light and the polarizer plates allow light irradiated from the backlight unit to be transmitted. Also, in order to independently drive liquid crystal of the sub-pixel region, generally a thin film transistor (TFT) driving circuit is integrated in the form of a 2D matrix form on the lower transparent substrate constituting a liquid crystal panel.

In the LCD device, pixels constituting an image do not emit light by themselves. That is, the LCD device displays an image by intermitting illumination light irradiated from a backlight source by combining two or more polarizer plates. In this case, a half or more of backlight is lost by the polarizer plates and only about one-third of light which has passed through the polarizer plates after passing through spatially separated color filters is used for displaying an image, and since a light loss occurs due to other optical film factors, so in an optical aspect, an LCD device has very low light usage efficiency.

Meanwhile, demand for a display device which may be able to provide excellent picture quality even in an ambient light environment such as strong natural light, or the like, in a field related to a portable device such as a portable phone, a tablet computer, a personal digital assistant (PDA), a portable multimedia device, or the like, a public information display, and outdoor advertisement display device, or the like, is on the rise. However, the existing transmissive LCD device has a problem in which luminance of display finally output through liquid crystal and a plurality of polarizer plates after being irradiated from a backlight is relatively low in comparison to ambient brightness by natural light. Also, readability and visibility are very low due to an influence of ambient light reflected from a surface of a liquid crystal display. Also, even in the case of a TV, a computer monitor, or the like, employing an LCD device, visibility is degraded due to an environment such as intensive indoor illumination. There has been a method of increasing luminance of a backlight source based on ambient light condition after detecting brightness of ambient light. However, there is a limitation in increasing luminance of a backlight source due to efficiency of a light emitting element and a technical problem such as heating, or the like, and in this case, power consumption is also rapidly increased.

Meanwhile, in order to secure visibility even in a bright ambient light environment and reduce power consumption by a backlight unit, a reflective LCD device using bright ambient light such as natural light, or the like, as a light source has been developed. Like a general transmissive LCD device, a reflective LCD device includes a liquid crystal layer, a color filter, a polarization filter or a polarizer plate, a transparent substrate, and the like, and an operation principle for displaying an image is similar to that of a transmissive LCD device. However, in a reflective LCD device, color filter of a certain region is removed a reflective layer, or the like, is added. The reflective LCD device is different from the transmissive LCD device, in that light made incident from the outside through the region from which a color filter was removed is reflected through the reflective layer to adjust brightness through liquid crystal of each sub-pixel and allowed to pass through a color filter to display an image. Since the reflective LCD device does not require an additional light source, power consumption is low and readability can be improved even in a bright ambient light environment. However, the reflective LCD device has shortcomings in that a picture quality may be degraded in an indoor or dark environment.

Recently, a trans-reflective LCD device, or the like, has been studied and developed as an LCD device combining a reflective LCD device using ambient light and a transmissive LCD device using an existing backlight illumination. However, in the trans-reflective LCD device, a region for a reflection operation and a region for a transmissive mode operation are areally divided and divided respective pixels of the display device are combined to be configured, so that a degradation of spatial resolution in case of transmissive mode driving and reflective mode driving cannot be avoided and a maximum light luminance cannot also be achieved in each mode. In particular, when the fact that portable devices such as portable phones, or the like, are used without being limited to places including indoor and outdoor areas and the fact that demand for low power consumption due to battery driving is increasing, and the like, are considered, a substitute for overcoming the limitation of the existing LCD devices is required.

DISCLOSURE OF THE INVENTION

Therefore, an object of the present invention is to provide a liquid micro-shutter display device having enhanced light usage efficiency compared to a transmissive display device such as a liquid crystal display (LCD) device, or the like, according to the existing technology.

Another object of the detailed description is to provide a liquid micro-shutter display device capable of displaying an image having characteristics intended by a user.

Another object of the detailed description is to provide a liquid micro-shutter display device capable of optimizing a transmission function based on backlight and a reflection function using ambient light as a light source in a single display device and providing the same.

To achieve these and other advantages and in accordance with the purpose of the present invention, as embodied and broadly described herein, there is provided a liquid micro-shutter display device including: a light source emitting light;

a transparent lower substrate positioned in an light path of the light source; an optical conversion unit performing at least one of a function of converting light from the light source into light having a different wavelength band corresponding to a sub-pixel and a function of reflecting ambient light corresponding to a sub-pixel; a transparent upper substrate positioned in an light path of light output from the optical conversion unit; and a liquid micro-shutter positioned between the transparent lower substrate and the transparent upper substrate and opening and closing the path of light or adjusting an open area.

Also, the liquid micro-shutter display device may further include: a lower transparent electrode layer for electrowetting driving; a lower panel including a liquid micro-shutter for opening and closing the path of light output from the optical conversion unit or adjusting the open area; and an upper panel including an upper transparent electrode layer for electrowetting driving.

Also, the liquid micro-shutter may include a partition structure having a cavity and non-polar non-conductive colored liquid within the partition structure.

Also, a space between the lower panel and the upper panel may include polar conductive transparent liquid, and the lower transparent electrode layer may include a first transparent insulating layer.

Also, the liquid micro-shutter display device may further include: a second transparent insulator layer between the optical conversion unit and the lower transparent electrode and the first transparent insulator layer.

Also, in electrowetting driving, an open area may be determined as the colored liquid gathers at a certain position of a surface of the first transparent insulator layer.

Also, the liquid micro-shutter display device may further include: a backlight unit for irradiating backlight.

Also, the backlight unit may include: a light guide plate element formed on a surface opposed to a junction surface with the transparent lower substrate and having a reflective layer; and a light source irradiating backlight to the light guide element.

Also, the reflective light may include a reflective pattern element having a plurality of fine prominences and depressions.

Also, the optical conversion unit may include: a light excitation light emitting unit made of a phosphor material for converting light of the light source into primary color light having a wavelength band corresponding to a sub-pixel; a dichroic reflective layer for reflecting the converted primary color light and allowing light from the light source which has not been converted to be transmitted therethrough; and an optical conversion region including at least one of color filters of each sub-pixel allowing primary color light corresponding to a sub-pixel to be transmitted therethrough.

Also, a driving circuit for supplying a driving signal for driving the liquid micro-shutter may be installed on the transparent lower substrate, and a smoothing layer may be formed on a surface of the driving circuit.

Also, when a driving voltage is applied to the lower transparent electrode layer and the upper transparent electrode layer, the liquid micro-shutter may be driven by an electric field between the lower transparent electrode layer and the upper transparent electrode layer generated by the driving voltage.

Also, the driving voltage may be applied according to an analog method.

Also, a voltage application waveform for applying the driving voltage may be formed as a digital waveform.

Also, the polar conductive transparent liquid may be a liquid having a refractive index such that a difference between the refractive index of the liquid and those of a light output surface of the lower panel and a light incident surface is minimized.

Also, the liquid micro-shutter display device may further include: an ambient light sensor; and a control unit for adjusting the quantity of light output from the light source based on a measurement result of the ambient light sensor.

Also, the light excitation light emitting unit may be formed as nano particles including at least one of quantum dots and nanorods.

Also, when the backlight irradiates primary color light corresponding to the lower pixel, the light excitation light emitting unit may be omitted.

To achieve these and other advantages and in accordance with the purpose of this specification, as embodied and broadly described herein, a liquid micro-shutter display device including: a light source emitting light having a first wavelength band; an optical conversion unit positioned in a path of light having the first wavelength band; and a liquid micro-shutter for opening and closing the path of output of light or adjusting an open area, and the optical conversion unit may include: a dichroic reflective layer for allowing light having the first wavelength band to be transmitted therethrough and reflecting light having other wavelength band than the first wavelength band; a light extraction light emitting unit for converting the light having the first wavelength band which has transmitted through the dichroic reflective layer into light having a second wavelength band; and a color filter allowing only light having the second wavelength band to be transmitted therethrough among ambient light made incident to a path different from that of light emitted from the light source.

Also, the dichroic reflective layer may be a dichroic filter.

Also, the liquid micro-shutter display device may further include: an ambient light sensor; and a control unit for adjusting the quantity of light output from the light source based on a measurement result of the ambient light sensor.

In the display device according to an embodiment of the present invention, by enhancing backlight usage efficiency and transmission efficiency more than an existing display device, an image having the same brightness can be displayed with low power consumption and a brighter image can be displayed with the same power consumption.

In the display device according to an embodiment of the present invention, by easily adjusting an open aperture ratio of a shutter, a screen having characteristics desired by a user can be easily expressed.

In the display device according to an embodiment of the present invention, In the display device according to an embodiment of the present invention, by performing a transmissive mode operation and a reflective mode operation while not degrading spatial resolution, maximum light luminance can be achieved in each mode and visibility and readability can be secured in various usage environments.

BRIEF DESCRIPTION OF THE DRAWINGS

FIG. 1 is a view showing a flat display panel and a unit pixel constituting the panel according to an embodiment of the present invention.

Figure 1:
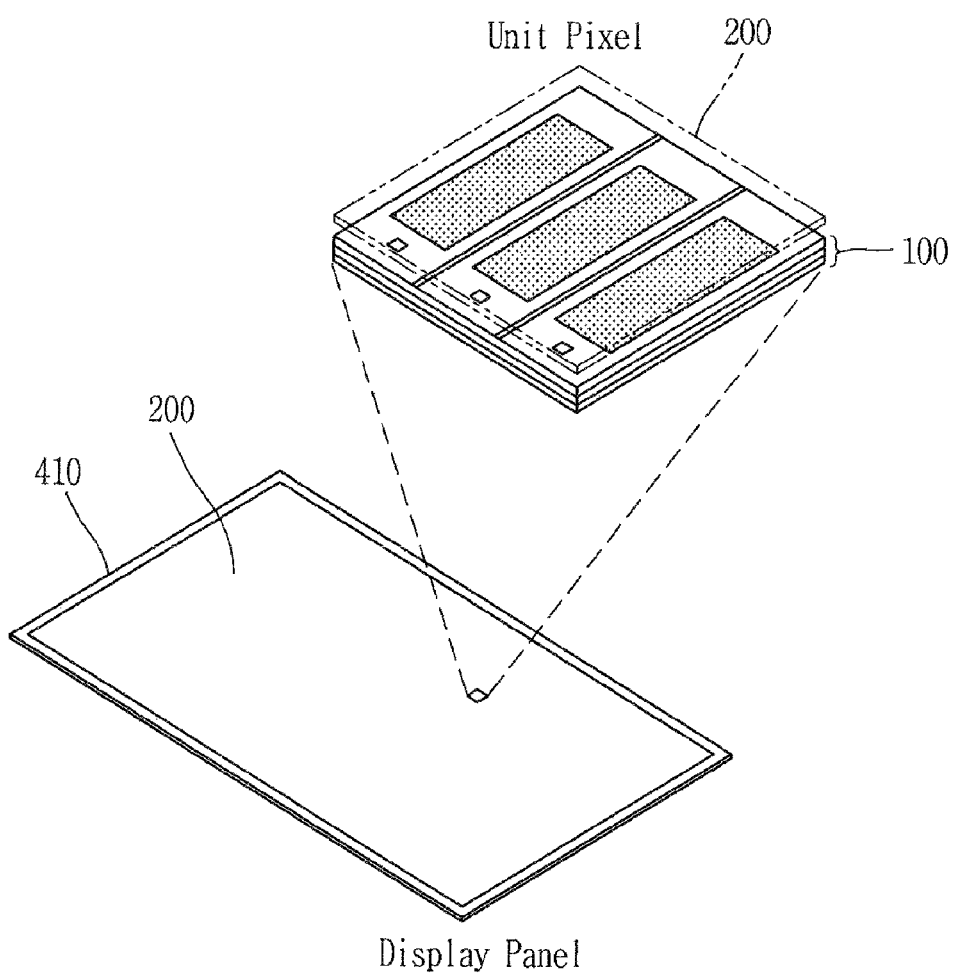
FIG. 1 is a front perspective view of a refrigerator according to the present disclosure.

MODES FOR CARRYING OUT THE
PREFERRED EMBODIMENTS

General terms which are widely used currently as possible in consideration of the functions of the present invention are selected as terms used in the present invention, but the terms may be changed according to an intention of a technical expert in the art, a precedent, an advent of a new technology, and the like. Also, in a particular case, there is a terminal arbitrarily set by an applicant of the present invention, and in this case, a meaning thereof will be described in detail in a corresponding description of the present invention. Thus, it is appreciated that terms used in the present invention should be defined based on a meaning of the term and general content of the present invention, rather than as a name of a simple term.

Throughout the specification, unless explicitly described to the contrary, the word "comprise" and variations such as "comprises" or "comprising", will be understood to imply the inclusion of stated elements but not the exclusion of any other elements.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a view showing a flat display panel and a unit pixel constituting the panel according to an embodiment of the present invention.

With reference to FIG. 1, a unit pixel may be configured by a lower panel 100 including a liquid micro-shutter and an upper panel 200 including transparent counter electrodes for electrowetting driving of the liquid micro-shutter. The unit pixel may be configured by individually dividing sub-pixels SP expressing primary colors such as red, green, blue, or the like. Edge portions of the lower panel 100 and the upper panel 200 are bonded and assembled to have an air-tight sealing structure 410, and a polar conductive transparent liquid 400 is sealed within the sealing structure to configure a display panel.

FIG. 2 is a detailed view showing a structure of the unit pixel in the liquid micro-shutter display device according to an embodiment of the present invention.

Figure 2A:
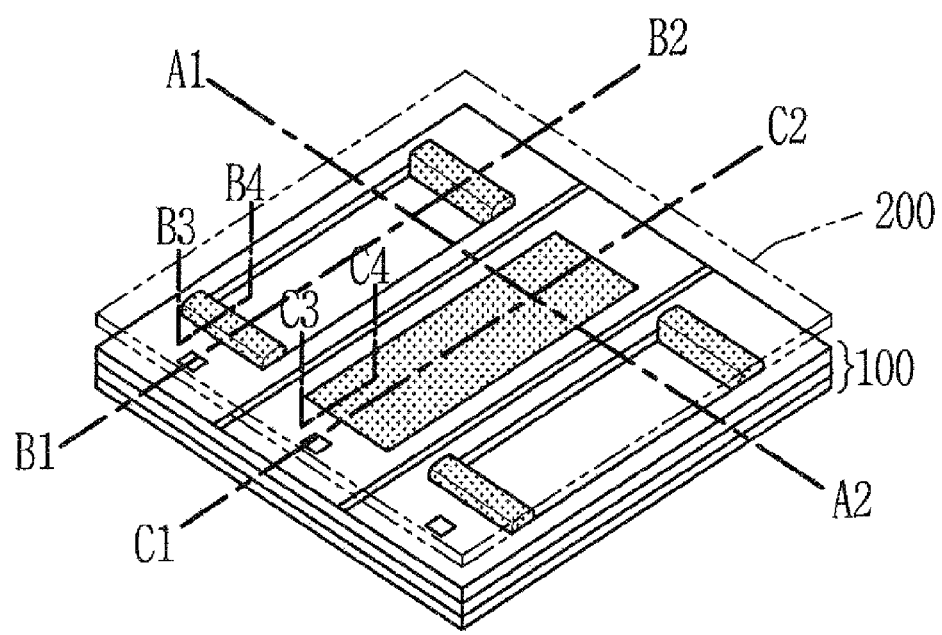
FIG. 2A is a perspective view of a unit pixel of a liquid micro-shutter display device.
Figure 2B:
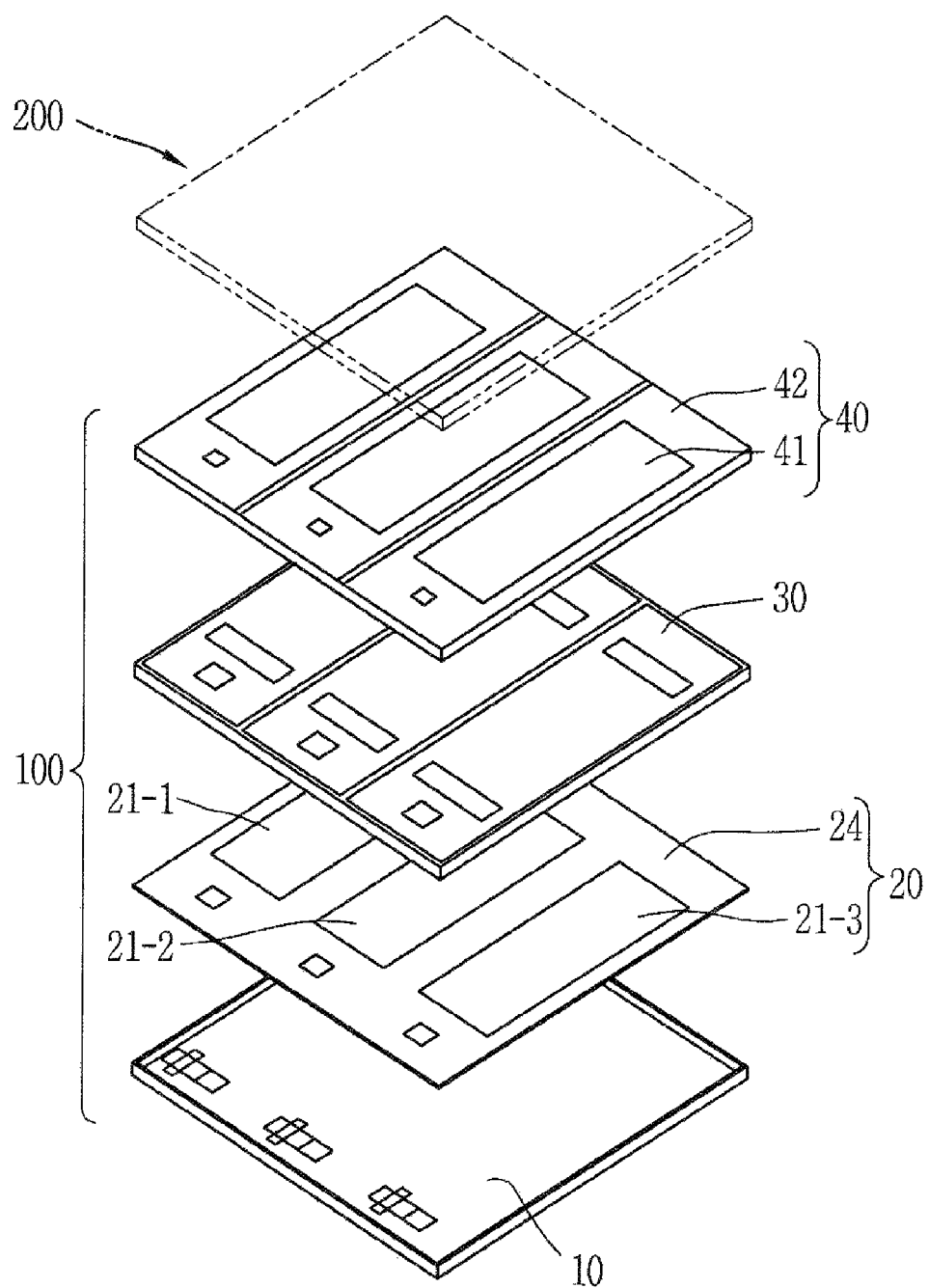
FIG. 2B is an exploded view of major components of the unit pixel.

FIG. 2A is a perspective view of a unit pixel of a liquid micro-shutter display device. FIG. 2B is an exploded view of major components of the unit pixel.

With reference to FIGS. 2A and 2B, the lower panel 100 of the liquid micro-shutter display device according to an embodiment of the present invention may include a transparent lower substrate 10 on which an electrode and an individual sub-pixel driving circuit such as a thin film transistor (TFT), or the like, are integrated, and an optical conversion unit 20, a lower transparent electrode layer 30 for electrowetting driving, and a micro-shutter array structure 40 sequentially stacked on the lower substrate 10. According to an embodiment of the present invention, an optical conversion region 21-1 for expressing red, an optical conversion region 21-2 for expressing green, an optical conversion region 21-3 for expressing blue, and the like, may be divided and arranged according to a shape of a light blocking unit 24. The lower transparent electrode layer 30 may include a lower transparent electrode having a planar shape suitable for electrowetting driving patterned thereon and made of indium tin oxide (ITO), and a first transparent insulating layer and a second transparent insulating layer for electrically insulating an upper portion and a lower portion of the transparent electrode. The liquid micro-shutter array structure 40 may include a non-polar insulating colored liquid 41 handling a shutter function for shielding or opening backlight or external light, and a sub-pixel sidewall grid 42 aligned in a sub-pixel optical conversion unit and having a fine cavity dividing and holding the colored liquid. Also, an upper transparent electrode layer is integrated on a lower surface of the upper panel 200.

Figure 3A:
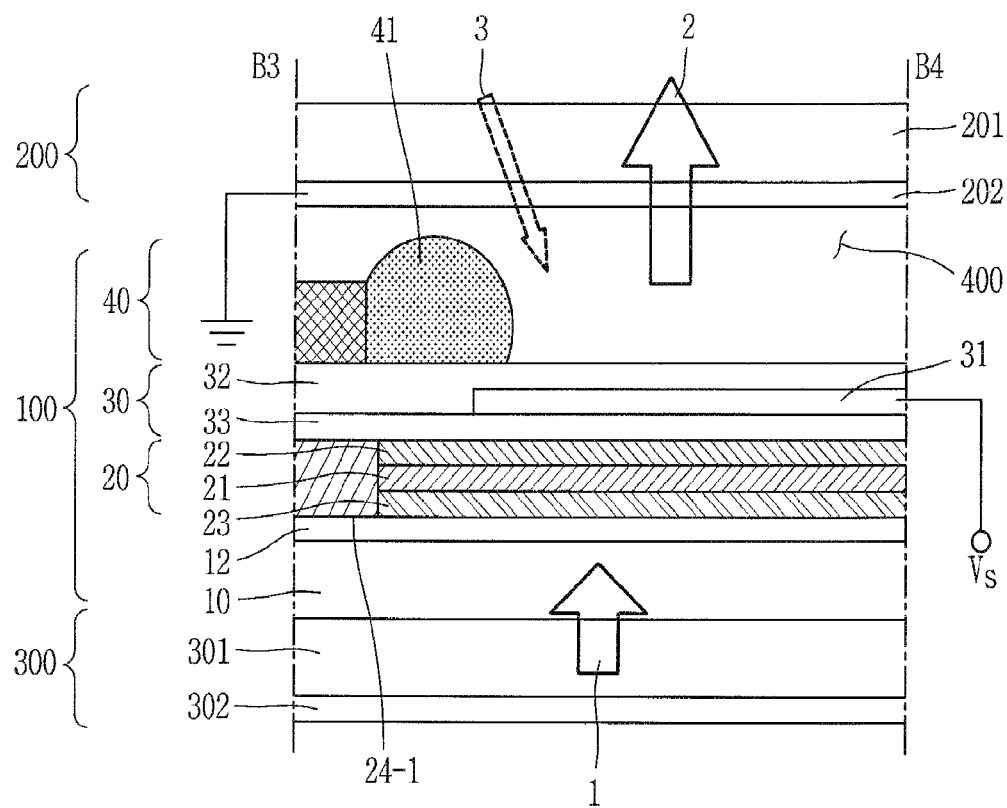
FIG. 3A is a sectional view taken along line B3-B4 in FIG. 2A.
Figure 3B:
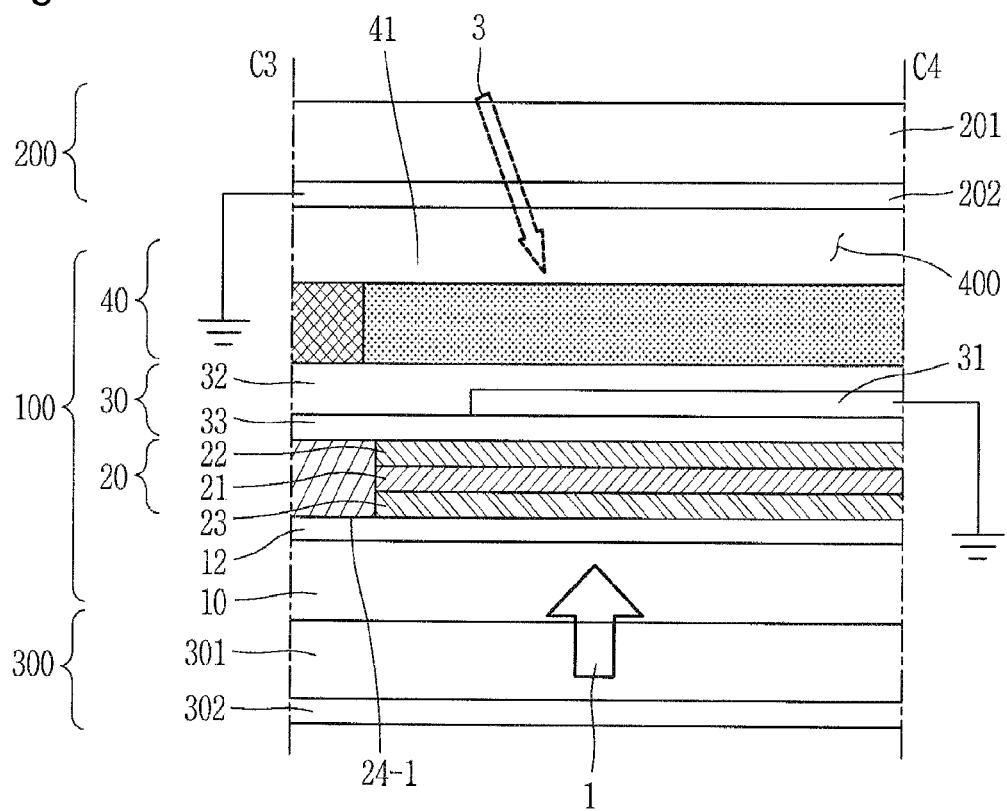
FIG. 3B is a sectional view taken along line C3-C4 in FIG. 2A.

FIG. 3A is a sectional view taken along line B3-B4 in FIG. 2A, and FIG. 3B is a sectional view taken along line C3-C4 in FIG. 2A. The structure of the micro-shutter display device will be described in detail with reference to FIG. 3.

With reference to FIGS. 3A and 3B, the lower panel 100 of the liquid micro-shutter display device may include a transparent lower substrate 10, an optical conversion unit 20 for performing at least one of a function of converting backlight to a primary color corresponding to a sub-pixel and a function of reflecting external light having a primary color band corresponding to a sub-pixel, a lower transparent electrode layer 30 for electrowetting driving, and a liquid micro-shutter 40 opening or closing a path of light output from the optical conversion unit 20 or adjusting an aperture area. Also, an upper panel 200 of the liquid micro-shutter display device according to an embodiment of the present invention may include a transparent upper substrate 201 and an upper transparent electrode layer 202 for electrowetting driving. Also, the liquid micro-shutter display device according to an embodiment of the present invention may further include a light source (not shown) positioned on a lower surface of the lower panel 100 and emitting light having a first wavelength band and a backlight unit 300.

The backlight unit 300 may include a transparent material light guide plate 301 for uniformly guiding backlight to the entire screen region, and a reflective layer 302 provided on a lower surface of the transparent material light guide plate and having high reflectance. The backlight unit 300 may be provided on a lower surface of the transparent lower substrate 10. Meanwhile, a light blocking unit reflective surface 24-1 may be formed in a certain region of the transparent lower substrate 10 facing the light blocking unit 24 of the optical conversion unit 20. The light blocking unit reflective surface 24-1 may reflect backlight 1 output from a light source (not shown). Or, a sub-pixel driving integrated circuit (IC) comprised of an electrode array or a TFT array may be installed on one surface of the transparent lower substrate 10. A smoothing layer 12 may be formed on a surface of the driving IC. The smoothing layer f12 may be configured as an insulator. In this case, the light blocking unit reflective surface 24-1 may be installed on an interface of the smoothing layer 12 and the light blocking unit 24.

According to an embodiment of the present invention, the backlight 1 may be multi-reflected by the reflective layer 302 and the light blocking unit reflective surface 24-1 between the transparent material light guide plate 301 and the transparent lower substrate 10. The backlight 1 may be made incident to a light aperture of the transparent lower substrate 10 in which the light blocking unit reflective surface 24-1 is not formed through the multi-reflection. Thus, the ratio of quantity of light of individual primary color output to the micro-shutter from the lower substrate over the quantity of backlight can be increased through the multi-reflection. Also, a backlight assembly may be configured by coupling a light guide plate element and the lower substrate, and a reflective layer may be bonded to or stacked on a lateral surface of the backlight unit assembly excluding a region to which light is made incident from backlight source to improve backlight usage efficiency. Also, the reflective layer 302 may include the path of reflective light to direct toward the lower substrate, and in order to enhance uniformity of a luminance distribution of the entire screen, the reflective layer 302 may include a reflective pattern element having a plurality of fine prominences and depressions.

The optical conversion unit 20 may include a light excitation light emitting unit 21 made of a fluorescent material for converting the backlight 1 having a first wavelength band to primary color light having a wavelength band different from that of the backlight 1 corresponding to a sub-pixel, a dichroic reflective layer 23 allowing the converted primary color light to be reflected and non-converted backlight to be transmitted therethrough, and a sub-pixel color filter 22 allowing the converted primary color light to be transmitted therethrough. Meanwhile, the light excitation light emitting unit 21 preferably, includes a phosphor material having a narrow full width at half maximum (FWHM) and emitting a light of a peak wavelength saturated in each primary color in a color coordinate system of a visible light region. Also, according to an embodiment of the present invention, the light excitation light emitting unit 21 may include a structure configured by applying quantum dot matrix phosphors containing quantum dot ensembles or quantum dots having light emission characteristics corresponding to respective sub-pixels. Also, the light excitation light emitting unit 21 may be configured according to required primary colors of each sub-pixel based on nano particles including quantum dots, nanorods, or the like, which have nanometer-level diameter and are a semiconductor excitation light emitting material.

The light excitation light emitting unit 21 includes phosphors emitting wavelength-converted light by using incident light as excitation light, as a photoluminescence material. By the light excitation light emitting unit 21, the backlight 1 is converted into an image display primary color light 2, one of red, green, and blue with respect to a corresponding sub-pixel. The dichroic reflective layer 23 allowing a wavelength band of the backlight 1 to be transmitted and reflecting the other converted wavelength region in relation to a component directing toward the lower backlight unit may be further included between the transparent substrate 10 and the light excitation light emitting unit 21. The dichroic reflective layer 23 may be implemented as an optical element such as a dichroic mirror or filter. A corresponding sub-pixel color filter 22 allowing a band of converted primary color light to be transmitted may be stacked at an upper portion of the light excitation light emitting unit 21. The color filter 22 allows only light corresponding to a corresponding sub-pixel, so it is required when a full color reflecting function is provided to the display device according to an embodiment of the present invention. When the display device according to an embodiment of the present invention is operated as a transmission type or monochrome reflective display device, the color filter 22 may be omitted.

The lower transparent electrode layer 30 may be formed at an upper portion of the optical conversion unit 20. The lower transparent electrode layer 30 may include a lower transparent electrode 31 having a patterned planar shape suitable for electrowetting driving and made of indium tin oxide (ITO), or the like, a first transparent insulator layer 32 for electrically insulating an upper portion of the lower transparent electrode 31, and a second transparent insulator layer 33 for electrically insulating a lower portion of the transparent electrode. Meanwhile, the second transparent insulator layer 33 may be formed by stacking a transparent thin film on a surface of the optical conversion unit 20 in order to restrain the optical conversion unit 20 from being discolored or deformed by an external environment. Also, an upper surface of the light blocking unit 24 in contact with the second transparent insulator layer 33 may be formed to include a black matrix or a surface of the material of the light blocking unit may be blackened in order to minimize reflection by external light.

Meanwhile, the polar conductive transparent liquid 400 may be sealed in a space between the lower panel 100 and the upper panel 200. Also, preferably, the conductive transparent liquid 400 is a liquid having a refractive index whose difference from a refractive index of a light output surface of the lower panel and a light incident surface of the upper panel is minimized. In this case, a light loss such as diffusion, total reflection, or the like, that may be generated from the respective interfaces can be minimized and image distortion can be reduced to provide a clear image.

Also, the dichroic reflective layer 23 that may be provided on a lower surface of the optical conversion unit may increase primary color reflecting efficiency of each sub-pixel in case of using external light 3. When external light 3 is strong like an outdoor natural light environment in a fine weather, an image can be displayed through only the reflective driving without using the backlight 1. Also, when intensity of external light like an indoor illumination environment is not sufficient, the intensity of the backlight 1 may be lowered to an appropriate level and reflection by external light is utilized to reduce power consumption of the display device.

Thus, the display device according to an embodiment of the present invention may perform the transmissive mode operation and reflective mode operation without degrading spatial resolution by the respective components included in the backlight unit 300 and the lower panel 100.

FIG. 3 shows a configuration of the optical conversion unit for each sub-pixel using a backlight source different from the primary colors constituting the display device. However, according to an embodiment of the present invention, when the backlight source is configured to have a band identical to the primary colors of the display device such as a red light emitting diode, or the like, the structure of sub-pixels expressing blue and green is configured to be the same as FIG. 3, and in the structure of the red sub-pixel the red light excitation light emitting layer 21 may be omitted. Also, when only the transmissive function, without the reflective function, is used in the display device, the color filters 22 of the respective red, green and blue sub-pixels may be omitted.

The liquid micro-shutter array structure 40 may include a non-polar insulating colored liquid 41 and the sub-pixel sidewall grid 42 aligned in the optical conversion unit of each sub-pixel and having a fine cavity dividing and holding the colored liquid. The insulating colored liquid 41 handles a shutter function of shielding or opening backlight or external light.

By applying a predetermined potential to the lower transparent electrode layer 30 and the upper transparent electrode layer 202, an electric field can be applied between the lower transparent electrode layer 30 and the upper transparent electrode layer 202. In this case, the liquid micro-shutter array structure 40 is opened and closed by a signal applied to the lower transparent electrode layer 30 for electrowetting driving and the upper transparent electrode layer 202 for electrowetting driving. That is, a driving deflection occurs in an in-plane direction of the lower substrate and the upper substrate, on which the liquid micro-shutter array structure is integrated, opposed to each other, to cover an optical conversion region provided on the lower substrate by the colored liquid or open it, thus opening and closing the micro-shutter array structure.

According to an embodiment of the present invention, FIG. 3A shows a state in which a driving voltage Vs applied to the lower transparent electrode layer 30 is different from a voltage of the upper transparent electrode layer, so the micro-shutter is open. That is, the insulating colored liquid 41 conglomerates in a predetermined region (a portion where the lower transparent electrode is not present) in which an electric field is not formed between the upper transparent electrode layer and the lower transparent electrode layer, whereby the liquid micro-shutter is open. Also, FIG. 3B shows a state in which the driving voltage Vs applied to the lower transparent electrode layer 30 is equal to the voltage of the upper transparent electrode layer, to thus close the micro-shutter. That is, due to surface tension of the insulating colored liquid 41 and the polar conductive transparent liquid 400 in a steady state and a balanced state between the two liquids 41 and 400 and the hydrophobic first transparent insulating layer 32 and a sub-pixel partition structure 42, the liquid micro-shutter is closed. This occurs due to a phenomenon in which the polar liquid is phase-separated at an upper portion of the non-polar liquid. Also, as mentioned above, a transparent electrode is provided at an upper portion of the polar liquid and electrically connected with the polar liquid.

That is, FIG. 3A shows a process in which the primary color light 2 of a sub-pixel output from the optical conversion unit 20 is transmitted through the optical aperture in the vicinity of the blocking colored non-polar liquid 41 to express a primary color of the corresponding sub-pixel through the color conversion process as described above. FIG. 3B shows a state in which the primary color 2 output from the optical conversion unit 20 is blocked by the colored non-polar liquid 41 covering the optical aperture so as to be displayed in black on the screen.

FIG. 4 is a view showing a principle of transmissive mode driving using the backlight source 310 as illumination light of an image display in a direct-view full color display including a liquid micro-shutter array as an optical switching element.

Figure 4A:
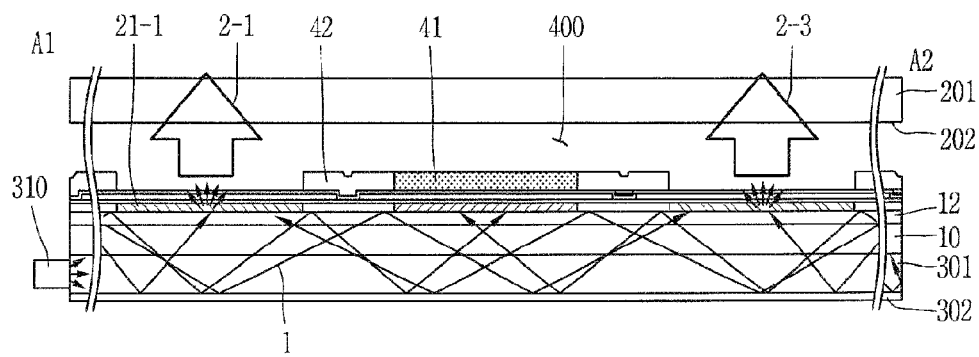
FIG. 4A is a sectional view taken along a virtual line of A1-A2.
Figure 4B:
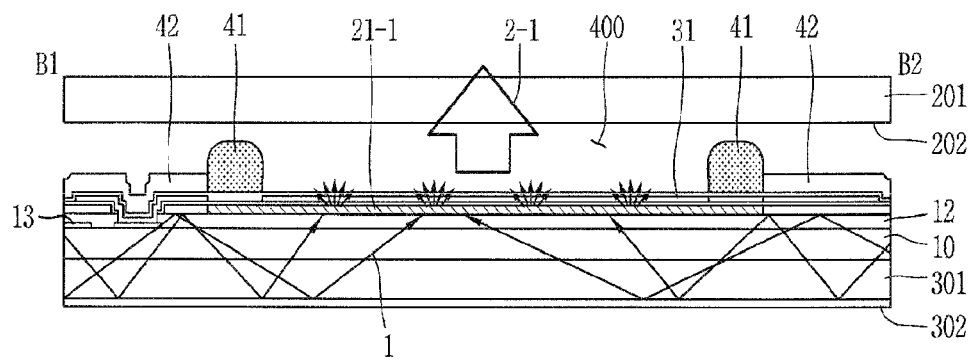
FIG. 4B is a sectional view taken along a virtual line of B1-B2.
Figure 4C:
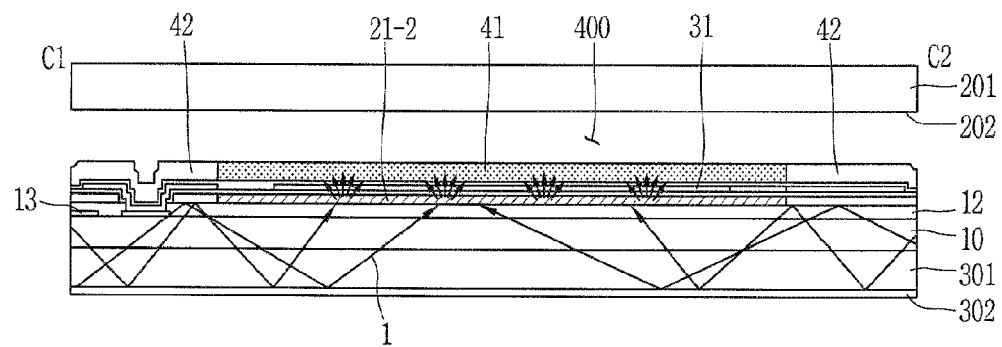
FIG. 4C is a sectional view taken along a virtual line of C1-C2.

FIG. 4 is views showing sections taken along virtual lines A1-A2, B1-B2, and C1-C2 of the display device shown in FIG. 2A. FIG. 4A is a sectional view taken along a virtual line of A1-A2, FIG. 4B is a sectional view taken along a virtual line of B1-B2, and FIG. 4C is a sectional view taken along a virtual line of C1-C2. A principle of a pixel operation will be described in detail with reference to FIG. 4. FIG. 4A shows a process of outputting red and blue conversion light beams proportional to an open area of each liquid micro-shutter. Meanwhile, in the pixel display operation, green conversion light is blocked. The backlight 1 output from the light source 310 is multi-reflected by the reflective layer 302 and the light blocking unit reflective surface 24-1 between the transparent material light guide plate 301 and the lower transparent substrate 10. The multi-reflected backlight 1 is output toward the transparent upper substrate 201 in the optical open area in which the light blocking unit is not formed. In the output process, the backlight 1 is converted into red 2-1, green, blue 2-3, or the like, required for corresponding sub-pixels which are spatially divided, through the optical conversion regions 21-1, 21-2, and 21-3 integrated in the optical open area. With reference to FIG. 4A, the shutter is open in the region in which the red conversion light 2-1 and the blue conversion light 2-3 pass through. Thus, in the regions, the conversion light is displayed on the screen. The shutter is closed in the region in which the green conversion light passes through. Thus, the conversion light is not displayed on the screen in the region. When the sub-pixels are operated as described above, a unit pixel may display violet.

FIG. 4B shows a state I which the backlight 1 is converted to display the red 2-1 in the red sub-pixel in which the liquid micro-shutter is open. FIG. 4C shows a state in which the liquid micro-shutter of the green sub-pixel is closed to interrupt an output of green conversion light.

Meanwhile, preferably, the non-polar liquid 41 having the micro-shutter function is configured to be black. The reason is because when the non-polar liquid 41 is configured to be block, conversion light blocking efficiency and efficiency of restraining reflection of external light can be further increased.

Also, according to an embodiment of the present invention, a transmissive display device for displaying a full color image can be provided by controlling a driving signal according to a gray scale required for each individual sub-pixel according to an individual sub-pixel required for displaying a full image.

Figure 5A:
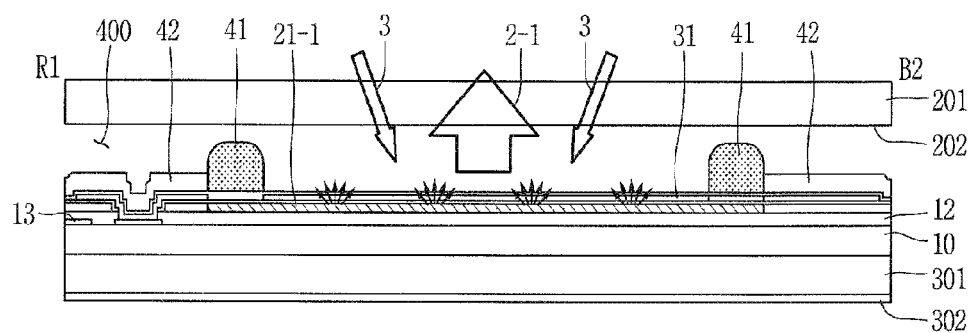
FIG. 5 is a view schematically showing a reflective mode driving principle of a liquid micro-shutter display device according to an embodiment of the present invention.
Figure 5B:
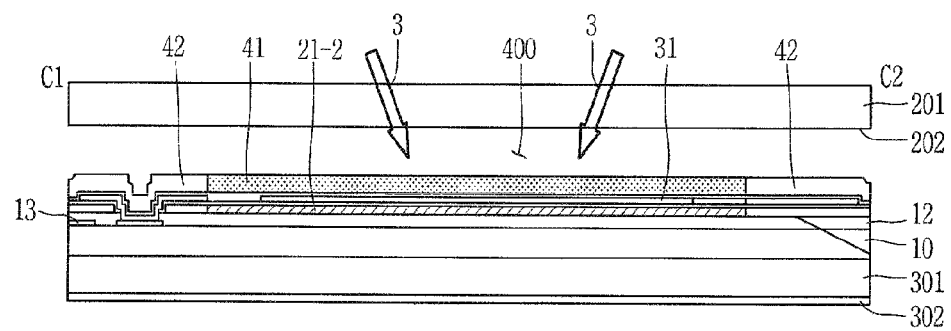

FIG. 5 is a view schematically showing a reflective mode driving principle of a liquid micro-shutter display device according to an embodiment of the present invention. According to an embodiment of the present invention, the liquid micro-shutter display device may use ambient light 3 as an illumination light source without the backlight 1. Also, during the reflective mode operation, a full color display can be performed. With reference to FIG. 5, when natural light or indoor illumination light having high luminance is made incident to the liquid micro-shutter display device, ambient light 3 is made incident to the optical conversion unit 20 in a shutter open state as shown in the figure (a) in which the optical conversion region 21-1 of individual pixels and an optical open area of the liquid micro-shutter are aligned along an light path. Only light of a band corresponding to sub-pixels in the color filter 22 of the incident ambient light 3 is transmitted to reach the dichroic reflective layer 23. Light that has reached the dichroic reflective layer 23 is reflected from the dichroic reflective layer 23 and output to an output side.

As described above, the primary color wavelength band required for a corresponding sub-pixel is reflected by the color conversion function provided in the optical conversion region 21-1 to thus display a color. Meanwhile, in a shutter close state as shown in FIG. 4b in which the ambient light 3 is prevented from reaching the optical conversion region 21-1 by the liquid 41 of the liquid micro-shutter, a corresponding sub-pixel is expressed as black.

Also, when the backlight 1 and the ambient light 3 are simultaneously used, light of a wavelength band converted by the excitation light emitting unit 21 and light of a band corresponding to a sub-pixel are combined and output, and thus, the entire light output can be increased.

As described above, each liquid micro-shutter may be driven by an image control signal of the individual sub-pixels required for configuring an image. Through such driving, an entire image desired by the user can be displayed.

Meanwhile, according to an embodiment of the present invention, the transmissive mode operation described in FIG. 4 and the reflective mode operation described in FIG. 5 may be simultaneously performed.

According to an embodiment of the present invention, the display device according to an embodiment of the present invention can perform a transmissive mode operation and a reflective mode operation without degrading spatial resolution to achieve a maximum light luminance for each mode and secure visibility and readability. Also, by optimizing and actively adjusting transmissive mode operation and reflective mode operation, the display device according to an embodiment of the present invention can reduce power consumption and provide clear picture quality any time in any place.

Figure 6:
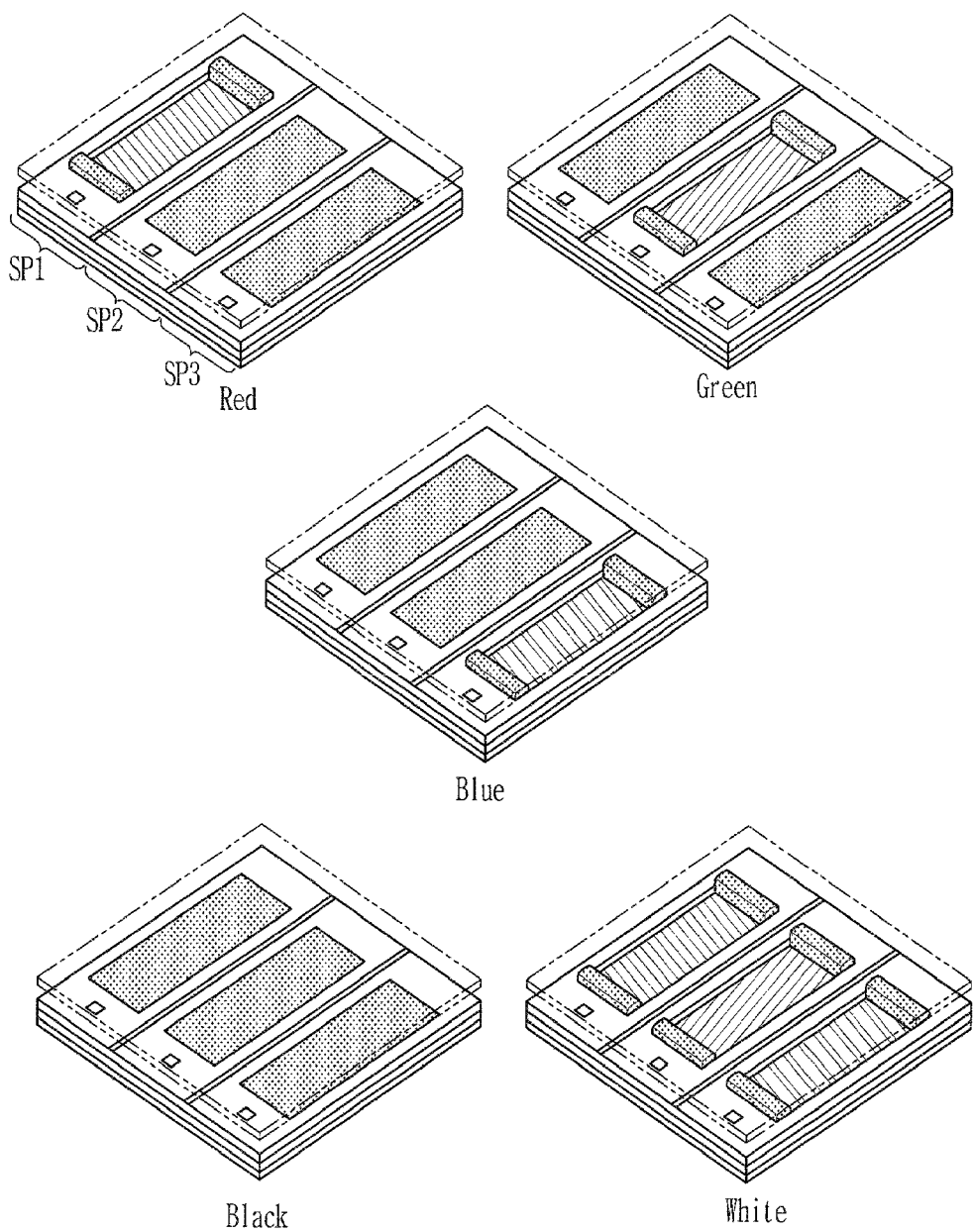
FIG. 6 is a view showing a pixel configuration of the liquid micro-shutter display device and a color display method of pixels according to an embodiment of the present invention.

FIG. 6 is a view showing a pixel configuration of the liquid micro-shutter display device and a color display method of pixels according to an embodiment of the present invention. According to an embodiment of the present invention, t a unit pixel may include sub-pixels SP1, SP2, SP3 expressing red, green, and blue.

In the micro-shutter display device according to an embodiment of the present invention, pixels having a configuration as shown in FIG. 6 are arranged in a two-dimensional matrix form on a screen region. With reference to FIG. 6, red, green, and blue are displayed by driving sub-pixels corresponding to respective primary colors in a shutter open state, and black is expressed by maintaining all the sub-pixels in a shutter closed state. Also, white may be implemented by mixing primary colors by driving all the sub-pixels in a shutter open state. In order to express natural full color, a gray scale of individual primary colors or brightness should be expressed. To this end, gray scale of an image display color required for individual sub-pixels can be represented by independently driving a micro-shutter of an individual sub-pixel.

FIG. 7 shows a method for driving a liquid micro-shutter of each sub-pixel according to an analog driving method. As electrostatic force is changed by a driving voltage Vs, surface tension or surface energy in an interface in which the polar transparent liquid 400, the first transparent insulating layer 32, and the non-polar colored liquid 41 are in contact is c hanged. An interface between the two types of liquids 41 and 400 and the solid 32 is formed at a certain position of the surface of the first transparent insulating layer 32 at which surface tension of the two types of liquids 41 and 400 and the solid 32 is balanced. Meanwhile, an open area of the liquid micro-shutter is determined by the interface which is changed according to a driving voltage. Thus, according to an embodiment of the present invention, a light path aperture ratio by the liquid micro-shutter can be controlled based on the size of the driving voltage. And, by adjusting the quantity of light of primary color light output from the optical conversion unit according to an analog driving method, gray scale or brightness of the display device can be controlled.

Figure 7A:
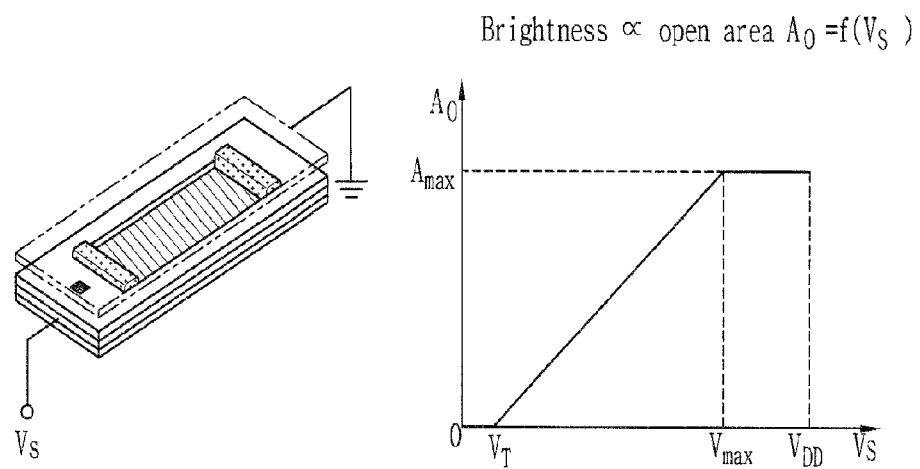
FIG. 7A is a view showing a method of applying a driving voltage ($V_S$) to sub-pixels and a change in an aperture area of a micro-shutter according to a driving voltage.
Figure 7B:
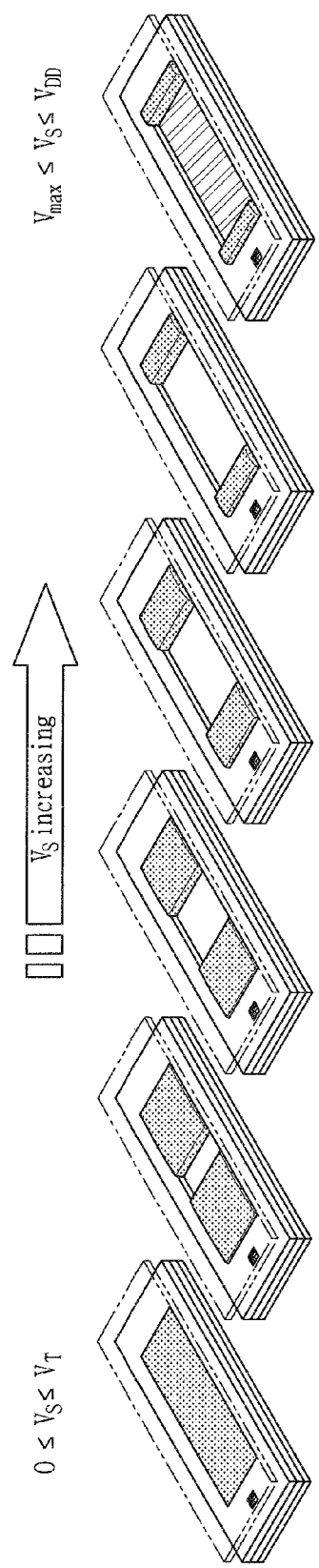
FIG. 7B is a view showing a change in the aperture area of thee micro-shutter according to a driving voltage.

FIG. 7A is a view showing a method of applying a driving voltage ($V_S$) to sub-pixels and a change in an aperture area of a micro-shutter according to a driving voltage. FIG. 7B is a view showing a change in the aperture area of the micro-shutter according to a driving voltage. $V_T$ indicates a threshold voltage at which the liquid micro-shutter is open, $V_{max}$ indicates a driving voltage required for securing a maximum aperture area of the liquid micro-shutter, and $V_{DD}$ indicates a power source voltage applied to the lower panel 100 of the display device. With reference to FIG. 7, when the driving voltage is not higher than a threshold voltage, the liquid micro-shutter is closed. When the driving voltage exceeds the threshold voltage, the liquid micro-shutter is open according to the driving voltage, and when the driving voltage is $V_{max}$ or higher, the liquid micro-shutter is fully open.

However, the analog driving method may have a possibility of causing non-uniformity characteristics in a screen region in displaying an image. This is generated due to characteristics deviation among individual elements of the micro-shutter 100 which are integrated by sub-pixels and non-uniformity characteristics of driving power of the upper panel 200 in the entire screen region. Thus, the same driving characteristics can be easily secured within the entire screen display region, and a driving signal of a digital driving method which can implement by a simple driving circuit can be applied.

Figure 8A:
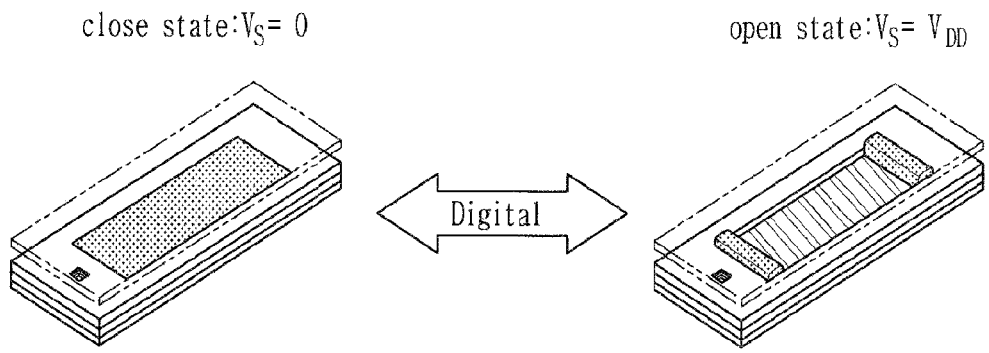
FIG. 8A is a view showing a closed state and an open state of the liquid micro-shutter of sub-pixels, and driving voltages of respective states.
Figure 8B:
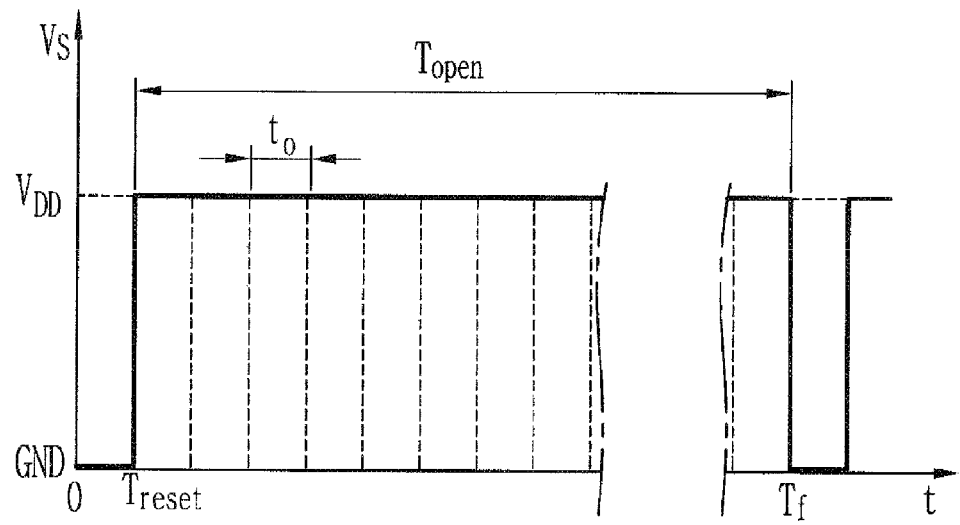
FIG. 8B is a view showing a driving voltage waveform of the liquid micro-shutter when a primary color of sub-pixels expressed by N-bit gray scales is displayed with maximum brightness.
Figure 8C:
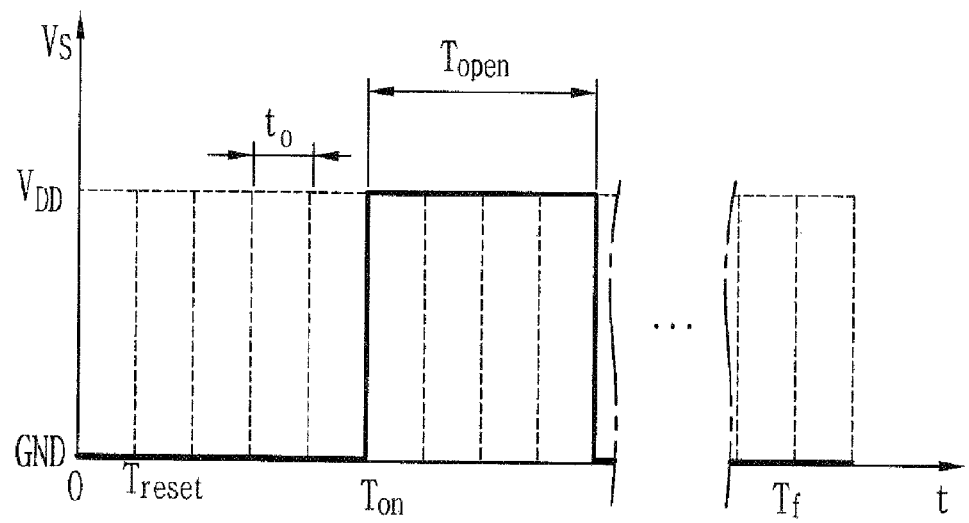
FIG. 8C is a view showing a driving voltage waveform of the liquid micro-shutter when a primary color of sub-pixels available for expressing by N-bit gray scales is displayed by a certain gray scale (a gray scale corresponding to a certain integer between 0 and ($2^N-1$).

FIG. 8 is a view showing an embodiment of application waveforms of driving voltages ($V_s$) for shutter driving. FIG. 8A is a view showing a closed state and an open state of the liquid micro-shutter of sub-pixels, and driving voltages of respective states. The driving waveforms in FIGS. 8B and 8C are used for digital driving representing multi-stage gray scales by time-dividing the two states of the open state and the closed state of the micro-shutter 40.

FIG. 8B is a view showing a driving voltage waveform of the liquid micro-shutter when a primary color of sub-pixels expressed by N-bit gray scales is displayed with maximum brightness, and FIG. 8C is a view showing a driving voltage waveform of the liquid micro-shutter when a primary color of sub-pixels available for expressing by N-bit gray scales is displayed by a certain gray scale (a gray scale corresponding to a certain integer between 0 and ($2^N$-1).

With reference to FIGS. 8B and 8C, a period of a unit image frame is indicated as $T_f$, and an initialization interval for each image frame such as converting an image signal corresponding to an individual sub-pixel into a driving signal during a certain time and initializing the micro-shutter 40 into a driving standby state, or the like, is indicated as $T_{reset}$. A time interval obtained by subtracting the frame initialization interval $T_{reset}$ from the image frame period $T_f$ may be allocated for representing a primary color gray scale of an individual sub-pixel. In case of the shutter closed state in the entire image gray scale representation section, the corresponding sub-pixel can express black having minimized luminance and saturation. When primary color light of a corresponding sub-pixel is output in the shutter open state in the entire gray scale representation section, a primary color having the highest saturation of ($2^N$-1) stage that can be expressed in the corresponding sub-pixel can be expressed. A time t0 obtained by dividing the allocated gray scale representation interval ($T_f$-$T_{reset}$) by the maximum gray scale stage ($2^N$-1) desired to be expressed is determined to be a minimum width of a micro-shutter unit driving pulse for a gray scale representation. A shutter open driving voltage $V_s$ ($V_{DD}$ in the example of FIG. 8) is allocated to a certain interval and applied within a gray scale representation interval within a frame period during an interval $T_{open}$ in which the unit driving pulse width is an integer multiple between 0 and ($2^N$-1), and a certain gray scale may be represented by maintaining a driving voltage such that the shutter closed state is maintained in the other remaining gray scale representation section. A driving electrical signal for displaying an image of the micro-shutter 40 for each individual sub-pixel of the micro-shutter display device according to an embodiment of the present invention may be supplied by an electrode arrangement or a thin film transistor circuit integrated and formed on the lower panel 100. In this case, a driving voltage for opening the shutter may be easily implemented by using the power source voltage VDD and a ground GND potential of the integrated circuit of the upper substrate. Also, $T_{on}$ means a timing at which the micro-shutter 100 for each pixel is changed to an open state. Preferably, Ton is optimized and determined in an image frame so that the corresponding gray scale can be most naturally recognized by a viewer. Also, such a gray scale representation may be variably implemented according to a user need.

In particular, compared with an electromechanical micro-shutter that may be implemented as a micro-mechanical structure, a higher open aperture ratio of the shutter can be easily implemented, a brighter and clearer image can be expressed.

An improved display device can be provided by combining the respective structures described in FIG. 3 and the driving signal application method of the present invention described in FIGS. 7 and 8. That is, the display device according to an embodiment of the present invention can achieve maximum light luminance for each mode by performing a transmissive mode operation and a reflective mode operation without degrading spatial resolution. Also, according to an embodiment of the present invention an improved image can be displayed on the display device by providing the structure having light usage efficiency enhanced more than the existing display device and the configuration capable of expressing an image of accurate luminance stage and luminance desired by a user. Thus, in the present invention, an image having brightness desired by a user can be easily expressed with reduced power consumption, and visibility and readability can be secured in various usage environments.

Figure 9A:
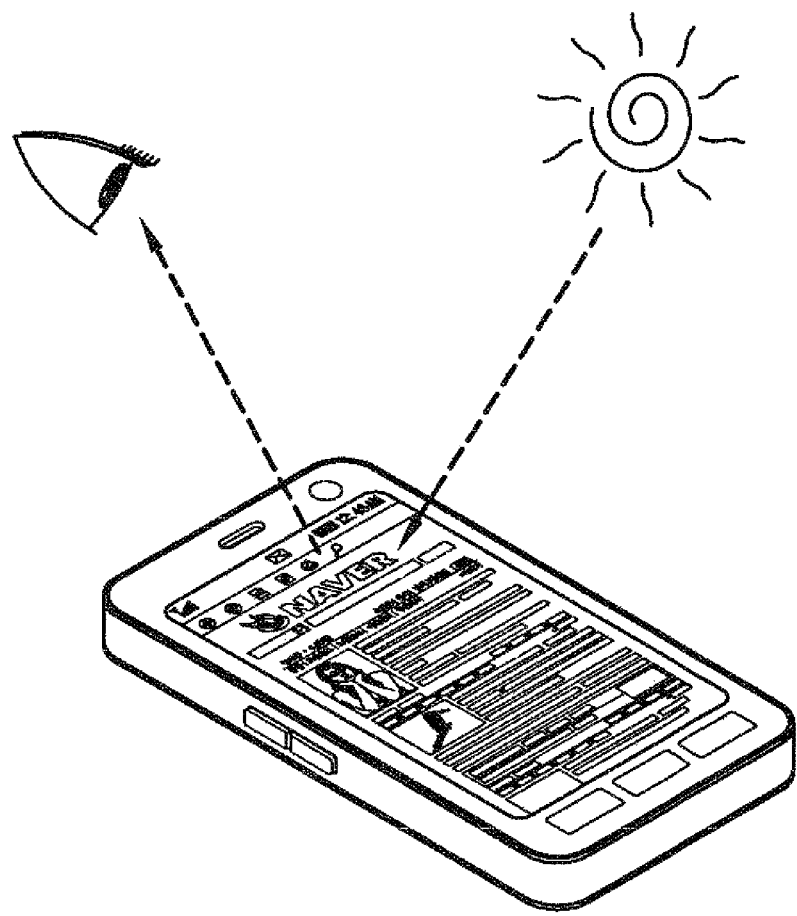
FIG. 9 is a view showing a usage example of applying the micro-shutter display device according to an embodiment of the present invention to a portable electronic device.
Figure 9B:
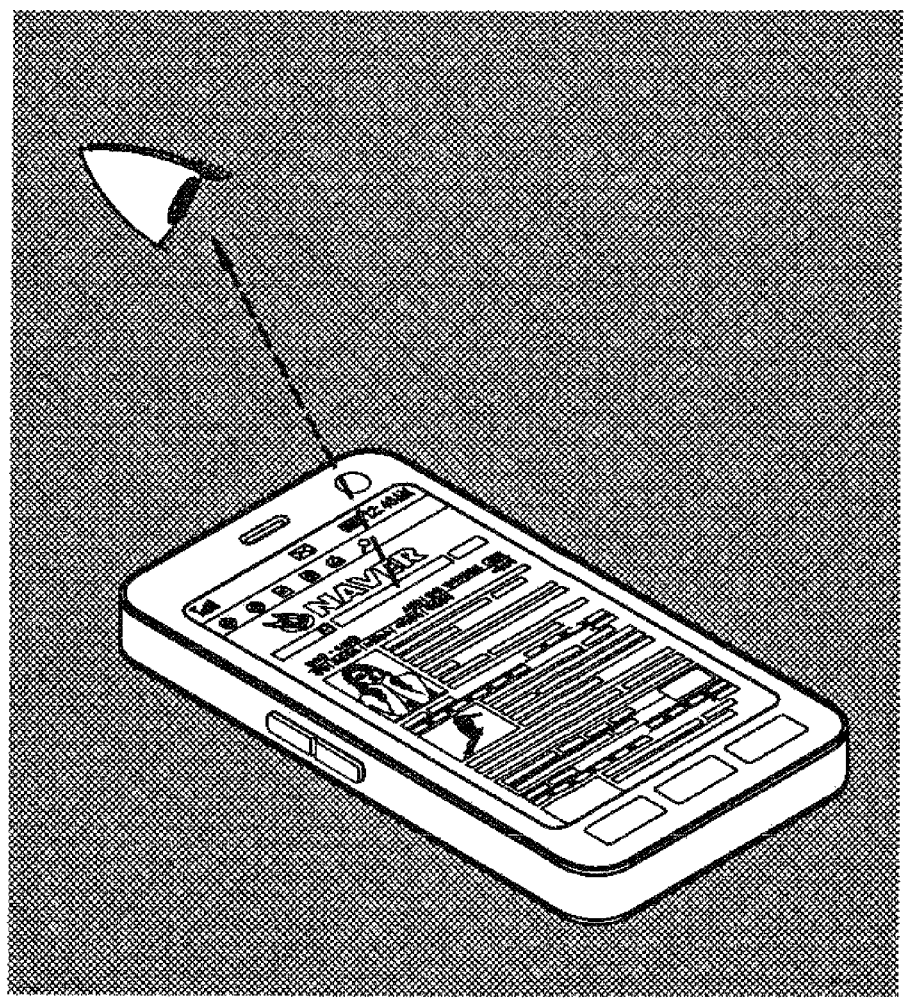

FIG. 9 is a view showing a usage example of applying the micro-shutter display device according to an embodiment of the present invention to a portable electronic device. FIG. 9A schematically shows a reflective full color screen display operation in a strong ambient light environment, and FIG. 9B illustrates an operation of displaying transmissive full color by backlight. The user can select whether to change a screen display method according to an ambient light environment as described above. Also, the display device may detect ambient light to automatically change a screen display method.

Figure 10:
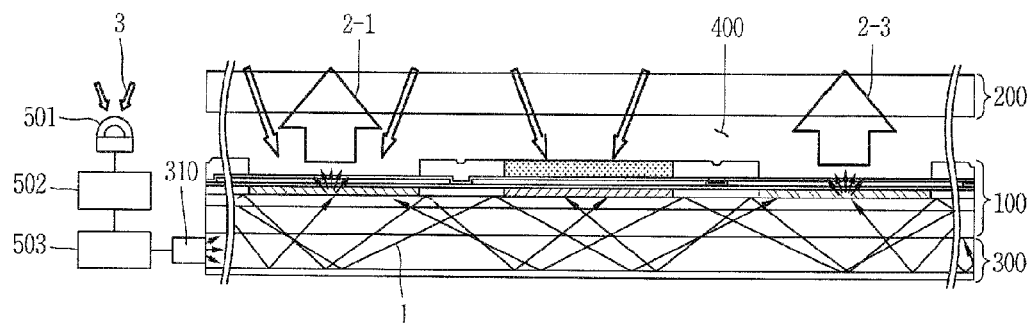
FIG. 10 is a view showing a configuration obtained by combining a unit for sensing an ambient light 3 environment and adjusting a light output of a backlight source 310 based on the sensed ambient light environment to thus optimize an image display contribution ratio of a transmissive mode operation and a reflective mode operation and use the both of the transmissive mode operation and the reflective mode operation.

FIG. 10 is a view showing a configuration obtained by combining a unit for sensing an ambient light 3 environment and adjusting a light output of a backlight source 310 based on the sensed ambient light environment to thus optimize an image display contribution ratio of a transmissive mode operation and a reflective mode operation and use the both of the transmissive mode operation and the reflective mode operation. With reference to FIG. 10, as an example of an environment adaptive display device, a photo sensor 501 for sensing intensity of light of ambient light, or the like, a logical calculation unit 502 for calculating an optimum condition such as determining a light output level of a backlight source according to an ambient light environment, and a light source controller 503 for adjusting a light output of the backlight source 310 according to the determined optimum display method, and the like, may be further added to the micro-shutter display device. By optimizing the transmissive and reflective mode operation, power consumption of backlight can be reduced. Also, sharp picture quality and high visibility suitable for an ambient light environment can be provided to a viewer.

The invention claimed is:

1. A liquid micro-shutter display device, comprising:
   a light source emitting light;
   a transparent lower substrate positioned in a light path of the light source;
   an optical conversion unit configured to perform at least one of a function of converting the light from the light source into light having a different wavelength band corresponding to a sub-pixel and a function of reflecting ambient light corresponding to the sub-pixel and to output at least one of the converted light and the reflected light;
   a transparent upper substrate positioned in a path of the light output from the optical conversion unit; and
   a liquid micro-shutter positioned between the transparent lower substrate and the transparent upper substrate and configured to open or close the path of the light output from the optical conversion unit or adjust an open area of the liquid micro-shutter.

2. The liquid micro-shutter display device of claim 1, further comprising:
   a lower transparent electrode layer for electrowetting driving the liquid micro-shutter;
   a lower panel including the liquid micro-shutter for opening and closing the path of the light output from the optical conversion unit or adjusting the open area; and
   an upper panel including an upper transparent electrode layer for electrowetting driving the liquid micro-shutter.

3. The liquid micro-shutter display device of claim 2, wherein a space between the lower panel and the upper panel includes polar conductive transparent liquid, and the lower transparent electrode layer includes a lower transparent electrode and a first transparent insulating layer.

4. The liquid micro-shutter display device of claim 3, further comprising:
   a second transparent insulator layer between the optical conversion unit and the lower transparent electrode and the first transparent insulator layer.

5. The liquid micro-shutter display device of claim 1, wherein the liquid micro-shutter includes a partition structure having a cavity and non-polar non-conductive colored liquid within the partition structure.

6. The liquid micro-shutter display device of claim 3, wherein, in electrowetting driving, the open area is determined as an area where the colored liquid gathers at a certain position of a surface of the first transparent insulator layer.

7. The liquid micro-shutter display device of claim 3, wherein the polar conductive transparent liquid is a liquid having a refractive index such that a difference between the refractive index of the liquid and those of a light output surface of the lower panel and a light incident surface is minimized.

8. The liquid micro-shutter display device of claim 2, wherein when a driving voltage is applied to the lower transparent electrode layer and the upper transparent electrode layer, the liquid micro-shutter is driven by an electric field between the lower transparent electrode layer and the upper transparent electrode layer generated by the driving voltage.

9. The liquid micro-shutter display device of claim 8, wherein the driving voltage is applied according to an analog method.

10. The liquid micro-shutter display device of claim 8, wherein a voltage application waveform for applying the driving voltage is formed as a digital waveform.

11. The liquid micro-shutter display device of claim 1, further comprising:
a backlight unit configured to irradiate backlight.

12. The liquid micro-shutter display device of claim 11, further comprising:
an ambient light sensor; and
a control unit configured to adjust a quantity of the light output from the light source based on a measurement result of the ambient light sensor.

13. The liquid micro-shutter display device of claim 11, wherein the backlight unit comprises:
a light guide plate element formed on a surface opposed to a junction surface with the transparent lower substrate and having a reflective layer; and
the light source irradiating the backlight to the light guide element.

14. The liquid micro-shutter display device of claim 13, wherein the reflective layer includes a reflective pattern element having a plurality of fine prominences and depressions.

15. The liquid micro-shutter display device of claim 1, wherein the optical conversion unit comprises:
a light excitation unit made of a phosphor material for converting the light of the light source into primary color light having a wavelength band corresponding to the sub-pixel;
a dichroic reflective layer for reflecting the converted primary color light and allowing light from the light source which has not been converted to be transmitted therethrough; and
an optical conversion region including at least one of color filters of each sub-pixel allowing the primary color light corresponding to the sub-pixel to be transmitted therethrough.

16. The liquid micro-shutter display device of claim 15, wherein the light excitation unit is formed as nano particles including at least one of quantum dots and nanorods.

17. The liquid micro-shutter display device of claim 1, wherein a driving circuit for supplying a driving signal for driving the liquid micro-shutter is installed on the transparent lower substrate, and a smoothing layer is formed on a surface of the driving circuit.

18. The liquid micro-shutter display device of claim 15, wherein when a backlight irradiates the primary color light corresponding to the sub-pixel, the light excitation unit is omitted.

19. A liquid micro-shutter display device, comprising:
a light source emitting light having a first wavelength band;
an optical conversion unit positioned in a path of light having the first wavelength band and configured to output the light; and
a liquid micro-shutter configured to open or close the path of the light output from the optical conversion unit or adjust an open area of the liquid micro-shutter,
wherein the optical conversion unit comprises:
a dichroic reflective layer configured to allow the light having the first wavelength band to be transmitted therethrough and reflect the light having other wavelength band than the first wavelength band;
a light extraction unit configured to convert the light having the first wavelength band which has transmitted through the dichroic reflective layer into light having a second wavelength band; and
a color filter configured to allow only the light having the second wavelength band to be transmitted therethrough among ambient light made incident to a path different from that of the light emitted from the light source.

20. The liquid micro-shutter display device of claim 19, wherein the dichroic reflective layer is a dichroic filter.

21. The liquid micro-shutter display device of claim 19, further comprising:
an ambient light sensor; and
a control unit configured to adjust a quantity of the light output from the light source based on a measurement result of the ambient light sensor.

* * * * *